United States Patent [19]

Cuomo et al.

[11] 4,393,967
[45] Jul. 19, 1983

[54] ELECTROSTATIC CLUTCH

[75] Inventors: Jerome J. Cuomo, Lincolndale; Alfred J. Landon, Peekskill; Han C. Wang, Yorktown Height, all of N.Y.

[73] Assignee: International Business Machines Corporation, Armonk, N.Y.

[21] Appl. No.: 313,717

[22] Filed: Oct. 21, 1981

Related U.S. Application Data

[63] Continuation of Ser. No. 91,310, Nov. 5, 1979, abandoned.

[51] Int. Cl.³ .................... F16D 27/00; B65H 29/30; B05D 5/12
[52] U.S. Cl. ............................ 192/84 E; 204/192 S; 226/94; 427/93; 427/95; 427/249
[58] Field of Search ............... 192/84 E; 271/193; 226/94; 427/93, 95, 249; 204/192 S

[56] References Cited

U.S. PATENT DOCUMENTS

| | | | |
|---|---|---|---|
| 2,850,908 | 9/1958 | Foster | 192/84 E |
| 2,897,425 | 7/1959 | Waring | 192/84 E |
| 2,916,920 | 12/1959 | Planer et al. | 192/84 E X |
| 3,002,596 | 10/1961 | Fitch | 192/84 E |
| 3,343,636 | 9/1967 | Donelan et al. | 192/84 E |
| 3,356,195 | 12/1967 | Hale et al. | 192/84 E |
| 3,655,019 | 4/1972 | Trzaska | 192/84 E X |
| 3,871,944 | 3/1975 | Dominguez-Burguette | 192/84 E X |

FOREIGN PATENT DOCUMENTS 994676  6/1965  United Kingdom ............. 192/84 E Primary Examiner—Allan D. Herrmann
Attorney, Agent, or Firm—Sughrue, Mion, Zinn, Macpeak and Seas

[57] ABSTRACT

An electrostatic clutch operable by the Johnsen-Rahbek effect, which may be used to operate, e.g., a print hammer device, is described, said clutch comprising a rotatable drum and a band engagable therewith, wherein the engagable surface of the drum is a semiconductive surface prepared by sputtering or vapor depositing a layer of substantially pure silicon carbide onto a conductive substrate.

24 Claims, 1 Drawing Figure

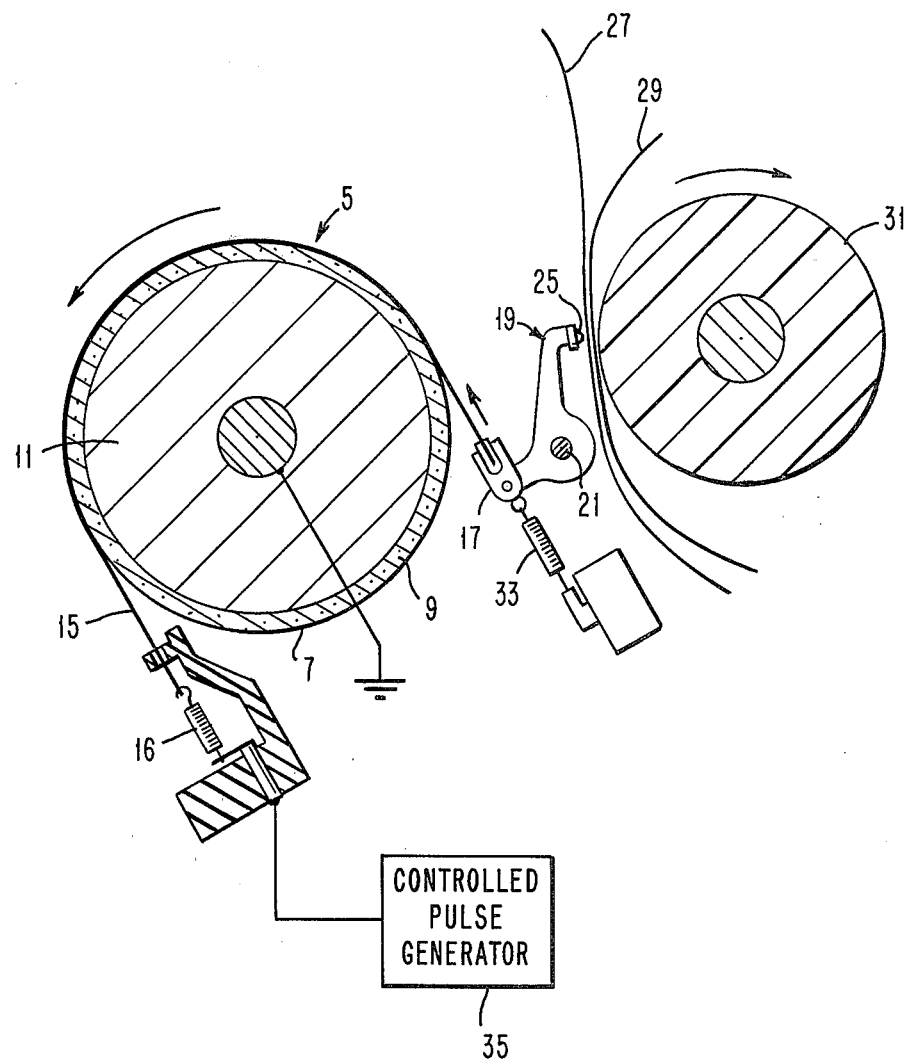

ELECTROSTATIC CLUTCH

This is a continuation of application Ser. No. 91,310, filed Nov. 5, 1979, now abandoned.

BACKGROUND OF THE INVENTION

This invention relates to an electrostatic clutch operable by the Johnsen-Rahbek effect.

The Johnsen-Rahbek effect refers to electrostatic adhesion between the surface of an electrically conducting member and a closely adjacent surface of a semiconductive member under an applied voltage. This effect and application thereof are well known, and are described in the literature, e.g., in Fitch, C. J., "Development of the Electrostatic Clutch" IBM Journal of Research and Development, Volume I, January, 1957 page 49 et seq., and in Stuckes, A. D., "Some Theoretical and Practical Considerations of the Johnsen-Rahbek Effect" Proceedings I.E.E., Volume 103, Part No. 8, Mar. 1956 page 125 et seq.

Although a clutch operable by the Johnsen-Rahbek effect is favored by the development of relatively high mechanical forces using only low levels of input control energy, problems of wear and heat generation present formidable barriers to this utilization of the Johnsen-Rahbek effect.

Various attempts have been made to overcome or compensate for these problems. For example, U.S. Pat. No. 2,850,908, issued Sept. 9, 1958 describes a particular mechanical arrangement utilizing a pivoted lever having arms of unequal lengths in order to minimize wear and heating at the position at which maximum friction would normally occur. U.S. Pat. No. 3,871,944, issued Mar. 18, 1975 describes an integral laminar composite semiconductive element which may be used in electrostatic clutch or break devices in which a layer of semiconductive particles and a layer of metal particles are integrated with and bonded together by a hard non-conductive thermoset bonding resin; among the materials that may constitute the semiconductive particles described therein are silicon carbide, limestone, slate, barium titanate, etc., with phthalein-fluoran polymers being described as the preferred semiconductive material.

While the problems of wear and heat generation have been somewhat alleviated by such means, a continuing need for improved devices utilizing the Johnsen-Rahbek effect still exists.

SUMMARY OF THE INVENTION

According to the present invention, an improved electrostatic clutch operable by the Johnsen-Rahbek effect is provided. The clutch comprises a rotatable drum and a band engagable therewith, wherein the engagable surface of the drum is a semiconductive surface prepared by sputtering or vapor depositing a layer of substantially pure silicon carbide onto a conductive substrate.

In another aspect the invention relates to a print hammer including an electrostatic clutch according to the invention.

BRIEF DESCRIPTION OF THE DRAWING

The drawing illustrats an electrostatic clutch and print hammer according to the invention.

DETAILED DESCRIPTION OF THE INVENTION

The electrostatic clutch element according to the invention comprises a rotatable drum and a band engagable therewith. The engagable surface of the drum is a semiconductive surface prepared by sputtering or vapor depositing a layer of substantially pure silicon carbide onto a conductive substrate.

The use of a layer of silicon carbide as the semiconductive surface of the drum of the electrostatic clutch is advantageous in that the silicon carbide layer possesses superior wear and heat resistant properties compared to the semiconductive surfaces of electrostatic clutches according to the prior art. Furthermore, by preparing the semiconductive surface by sputtering or vapor depositing a layer of silicon carbide onto a conductive substrate to form a very thin and smooth coating, it is possible that no machining may be required after deposition, although machining may be employed to enhance the smoothness of relatively thick silicon carbide layers formed according to the invention.

The silicon carbide layer may be amorphous or crystalline, with a crystalline nature predominating when the silicon carbide layer is formed by high temperature (e.g., greater than 650° C.) chemical vapor deposition techniques, and an amorphous nature predominates when the silicon carbide layer is formed by low temperature (e.g., 300° C. to 600° C.) techniques, such as glow discharge and sputtering.

Although the sputtered or vapor deposited layer of silicon carbide is substantially pure, i.e. does not include other materials, such as a polymeric binder, which would affect the mechanical properties thereof, the substantially pure silicon carbide may include minor amounts of dopants for the purpose of controlling the electrical characteristics of the layer.

In one embodiment according to the invention, the semiconductive surface is prepared by vapor depositing a layer of substantially pure silicon carbide onto a conductive substrate. See SILICON CARBIDE—1968 (H. K. Henisch R. Roy eds. 1969), the disclosures of which are incorporated herein by reference. One type of vapor deposition process that can be used in preparing the substantially pure silicon carbide layer disclosed by Gareis and Mohr, U.S. Pat. No. 3,011,912. By this process, a reactant feed gas comprising either tetramethylsilane, a mixture of tetramethylsilane and methane or a mixture of silane ($SiH_4$) and methane is thermally decomposed under pressure in the presence of an inorganic substrate. More specifically, an inorganic substrate having a high enough melting point is placed in a suitable vacuum chamber, said vacuum chamber having an associate means for heating said inorganic substrate to and maintaining said inorganic substrate at a temperature of at least 750° C. After the vacuum chamber is sealed and evacuated, the reactant feed gas is then allowed to flow into the chamber as such a rate so as to maintain the reactant pressure therein at from about 0.1 mm.Hg to not greater than 2.0 mm.Hg. The inorganic substrate is then heated to a temperature of at least 750° C., while the reactant pressure is maintained within the above-described limits for the period of the thermal decomposition.

The type of vapor deposition process described above is termed "chemical vapor depostion," and is discussed in detail by Fitzer and Hegen, Chemical vapor deposition of silicon carbide and silicon nitride—

Chemistry's Contribution to Modern Silicon Ceramics, AGNEW. CHEM. INT. ED. ENGL. 18:295–304 (1974), the disclosures of which are incorporated herein by reference.

Another variation of the chemical vapor deposition technique that can be used with applicants' invention is described by Bean and Gleim, Some properties of vapor deposition SiC, J. ELETROCHEM. SOC. 114:1158–1161 (1967). This process employs the hydrogen reduction of silicon tetrachloride and the pyrolysis of a hydrocarbon. The flow system employed is a conventional vapor deposition unit. Silver palladium-purified hydrogen is used as the reducing agent for the silicon tetrachloride, and also as the carrier gas for the silicon halide and the hydrocarbon, toluene. Other hydrocarbons, both liquid and gaseous, also may be used successfully. Constant temperature baths are used to control the vapor pressures of the silicon halide and the hydrocarbon. A liquid nitrogen trap is employed to prevent backstreaming of the hydrocarbon into the pure hydrogen source. Anhydrous hydrogen chloride is used for in situ vapor etching of the substrate prior to silicon carbide film deposition. The optimum temperature for producing film with mirror-like plane surfaces was found by Bean and Gleim to be $1075° \pm 10°$ C. At this temperature, the deposition rate is 1.6 micron/min. at 0.89% silicon tetrachloride and 0.18% toluene.

Glow discharge deposition methods are also suitable for use with the claimed invention. The process disclosed by Wieder et al, Vibrational spectrum of hydrogenated amorphous Si-C films, PHYS. STAT. SOL. (b) 92:99–112 (1979), is illustrative. The substrate is subjected to standard cleaning techniques and then argon ion bombarded for 20 minutes prior to the onset of deposition. Two gases, silane and ethylene, are then introduced into a mixing chamber at partial pressures determined by the desired composition, i.e., the content of each species in the film is approximately proportional to the partial pressure of the corresponding gas.

The glow discharge technique is also discussed by Anderson, The electrical and optical properties of amorphous carbon prepared by the glow discharge technique, PHILOSOPHICAL MAGAZINE 35:17–26 (1977), the disclosures of which are incorporated herein by reference.

In another preferred embodiment of the invention, the engageable surface of the drum of the electrostatic clutch is a semiconductive surface prepared by sputtering a layer of silicon carbide onto a conductive substrate. Numerous sputtering techniques are well-known in the prior art, that is described by Nichino et al, Preparation of β-Sic films by r.f. sputtering, THIN SOLID FILMS 40:L27–L29 (1977) being exemplary. According to the method of Nichino et al, fine yellow crystals of β-silicon carbide are prepared by solution growth from molten silicon in a graphite crucible and then are ground into powder. The powder then is set in a thin quartz tray approximately 40 mm distant from the substrate, which is heated by a molybdenum strip heater. After preliminary evacuation of the reaction chamber to approximately $1 \times 10^6$ Torr, argon gas is introduced until the gas pressure of $1 \times 10^2$ Torr is obtained. R.F. power of 200 W (peak voltage 2 kV and frequency 13.5 MHz) is then applied and β-Sic films of about 1500 A in thickness obtained by sputtering for 60 minutes.

The details of a glow discharge apparatus suitable for use with the present invention are given by Brodsky et al, Infrared and Raman spectra of the silicon-hydrogen bonds in amorphous silicon prepared by glow discharge and sputtering, PHYS. REV. B 16:3556–3571 (1971), the disclosures of which are incorporated herein by reference. See also Brodsky et al, Quantitative analysis of hydrogen in glow discharge amorphous silicon. APPLIED PHYSICS LETTERS 30:561–563 (1977), the disclosures of which are also incorporated herein by reference.

The layer of silicon carbide deposited onto the conductive substrate by sputtering or vapor deposition thereof is substantially pure silicon carbide. The substantially pure silicon carbide may include minor amounts of one or more dopants, for the purpose of adjusting the electrical characteristics of the silicon carbide layer. Typically, it is desired that the resistivity of the silicon carbide be within a range from about $10^5$ to $10^7$ ohm-cm. Ultrapure silicon carbide has a resistivity of about $10^9$ ohm-cm.

The resistivity of the silicon carbide can be altered, in a controllable manner, by the inclusion of other chemical elements in the silicon carbide matrix, or by using non-stoichiometric proportions of silicon and carbon in forming the silicon carbide layer. Dopants useful in adjusting the electrical characteristics, e.g., resistivity, of the substantially pure silicon carbide layer forming the semiconductive surface of the drum of electrostatic clutch elements according to the invention include chemical elements from Groups IIIa and Va of the Periodic Table of the Elements, such as boron, nitrogen, aluminum, and phorphorous.

Due to the presence of impurities, including Group IIIa and Va dopants, the resistivity of the silicon carbide may be less than desired; in this event the resistivity can be raised by doping with hydrogen, as described above in Wieder et al, "Vibrational Spectrum of Hydrogenated Amorphous SiC Films," Physika Sta. Sol., 1979, page 99 et seq.

The use of non-stoichiometric proportions of silicon and carbon is described, e.g., in Bean et al, J. Electrochem. Soc., Vol. 114, 1967 page 1158 et seq., incorporated herein by reference above.

The resistance of the silicon carbon layer depends both upon the resistivity of the silicon carbide material and the thickness of the layer. In an electrostatic clutch according to the invention, it is generally desirable that the thickness of the layer be between 10 $\mu$m and 2,500 $\mu$m, although it is possible to prepare a useful clutch with a silicon carbide layer of greater or lesser thickness than this range. In more preferred embodiments of the invention, the silicon carbide layer has a thickness between 10 $\mu$m and 1,500 $\mu$m, and most preferably has a thickness between 100 $\mu$m and 500 $\mu$m.

The substrate onto which the layer of silicon carbide is sputtered or vapor deposited to form the semconductive surface on the rotatable drum must be electrically conductive. The substrate may comprise a base metal or conductive carbon. Preferred substrate materials include carbon, silicon, molybdenum, stainless steel, titanium alloys and aluminum alloys. The conductive substrate is electrically connected to a means capable of generating a pulse of applied voltage sufficient to create electrostatic adhesion by the Johnsen-Rahbek effect between the rotatable drum and band engagable therewith in an electrostatic clutch according to the invention.

The band of an electrostatic clutch according to the invention may be formed from numerous materials which will exhibit frictional adhesion to the semiconductive silicon carbide surface of the rotatable drum upon application of an applied voltage between the band and the drum, which causes engagement of the band and the rotatable drum by the Johnsen-Rahbek effect. Desirably the material of which the band is formed must be electrically conductive, and desirably should be both ductile and wear resistant. Preferred materials from which the band may be formed include stainless steel and tungsten alloys.

In a preferred aspect of the invention, a print hammer device is provided in which one or more print hammers can be actuated by an electrostatic clutch element according to the invention. For instance, a print hammer device as described in U.S. Pat. No. 2,850,908, issued Sept. 9, 1958, the disclosure of which is hereby incorporated by reference, in which the semiconductive surface of the drum of the electrostatic clutch element is prepared by sputtering or vapor depositing a layer of substantially pure silicon carbide onto a conductive substrate, is an example of a print hammer device according to the invention. Other print hammer devices in which the print hammer(s) can be actuated by an electrostatic clutch element according to the present invention include those described in U.S. Pat. No. 3,929,067, issued Dec. 30, 1975, and U.S. Pat. No. 2,909,996, issued Oct. 27, 1969, the disclosures of which are incorporated herein by reference.

Referring to the drawing a print hammer device utilizing an electrostatic clutch element according to the invention is illustrated. In operation, the rotatable drum 5 having an engagable surface 7 prepared by sputtering or vapor depositing a layer 9 of substantially pure silicon carbide onto a conductive substrate 11 (e.g., carbon) momentarily engages a steel band 15 in response to an electric pulse signal applied to the band, which causes momentary engagement, adhesion, and movement of the steel band by means of the Johnsen-Rahbek effect.

For instance, as illustrated in the drawing, the electrical pulse signal is transmitted to the band from a controlled pulse generator 35 through an electrical connection, which may be transmitted, e.g., through a spring directly attached to the band and hold the band in contact with the rotatable drum; the pulse results in passage of current from the band through the silicon carbide layer to the electrically grounded conductive substrate. Movement of the steel band in the direction indicated causes pulse transmitter 17 to actuate print hammer 19 to rotate about axis 21 thereof in the direction indicated to cause a printing character 25, e.g., a dot, to impinge upon an inked riblen 27 to transfer an image corresponding to the printing character 25 to a paper 29, against a platen 31. Spring 33 restores the print hammer to its original position.

EXAMPLE 1

An electrostatic clutch element as illustrated in the drawing was prepared by sputtering silicon carbide onto a two inch diameter solid carbon cylinder to form a layer of silicon carbide 75 $\mu$m thick. The thus-coated cylinder was used as a drum of an electrostatic clutch according to the invention, being rotated at a surface speed of 40 inches per second. A steel band having a thickness of about 0.002 inches and a width of 0.100 inches was wrapped around the drum cylinder for about 180° thereof with the width portion of the steel band contacting the drum cylinder, but with such light force that the rotating drum cylinder does not impart any movement to the steel band. Upon application of an electric pulse of 300$\mu$ seconds at 100 V, the steel band frictionally engages the rotating drum and generates a motion sufficient to drive a print hammer. After 100 hours of operation under the above-described conditions, with an electrical pulse frequency of 100 cycles/second, no measurable change in the thickness of the silicon carbide layer was detectable using a micrometer.

Although preferred embodiments of the invention have been described above, it is apparent that modifications and alterations thereto would occur to one skilled in the art without departing from the spirit and scope of the invention.

What is claimed is:

1. An electrostatic clutch operable by the Johnsen-Rahbek effect, comprising:
    a rotatable drum and a band engageable therewith, said drum including an engageable surface which is a semiconductive surface comprising a layer of substantially pure silicon carbide on a conductive substrate, said layer having a thickness between about 10 $\mu$m and 2,500 $\mu$m and containing a dopant in an amount effective to cause the resistivity of the layer to be within a range of from about $10^5$ to $10^7$ ohm-cm.

2. An electrostatic clutch as claimed in claim 1, wherein said layer of silicon carbide is an amorphous layer prepared by sputtering.

3. An electrostatic clutch as claimed in claim 1, wherein said layer of silicon carbide is a crystalline layer prepared by vapor deposition.

4. An electrostatic clutch as claimed in claim 1, wherein said layer of silicon carbide has a thickness between 10 $\mu$m and 1,500 $\mu$m.

5. An electrostatic clutch as claimed in claim 1, wherein said layer of silicon carbide has a thickness of between 100 $\mu$m and 500 $\mu$m.

6. An electrostatic clutch as claimed in claim 1, wherein said dopant is boron.

7. An electrostatic clutch as claimed in claim 1, wherein said dopant is aluminum.

8. An electrostatic clutch as claimed in claim 1, wherein said dopant is gallium.

9. An electrostatic clutch as claimed in claim 1, wherein said dopant is indium.

10. An electrostatic clutch as claimed in claim 1, wherein said dopant is thallium.

11. An electrostatic clutch as claimed in claim 1, wherein said dopant is nitrogen.

12. An electrostatic clutch as claimed in claim 1, wherein said dopant is phosphorous.

13. An electrostatic clutch as claimed in claim 1, wherein said dopant is arsenic.

14. An electrostatic clutch as claimed in claim 1, wherein said dopant is antimony.

15. An electrostatic clutch as claimed in claim 1, wherein said dopant is bismuth.

16. An electrostatic clutch as claimed in claim 1, wherein said dopant is hydrogen.

17. An electrostatic clutch as claimed in claim 1, wherein said band is formed of stainless steel.

18. An electrostatic clutch as claimed in claim 1, wherein said band is formed of a tungsten alloy.

19. An electrostatic clutch as claimed in claim 1, wherein said conductive substrate is carbon.

20. An electrostatic clutch as claimed in claim 1, wherein said conductive substrate is silicon.

21. An electrostatic clutch as claimed in claim 1, wherein said conductive substrate is molybdenum.

22. An electrostatic clutch as claimed in claim 1, wherein said conductive substrate is stainless steel.

23. An electrostatic clutch as claimed in claim 1, wherein said conductive substrate is a titanium alloy.

24. An electrostatic clutch as claimed in claim 1, wherein said conductive substrate is an aluminum alloy.

* * * * *